July 14, 1964
M. W. ASHER
3,140,775
CONVEYOR
Filed Oct. 9, 1962
2 Sheets-Sheet 1
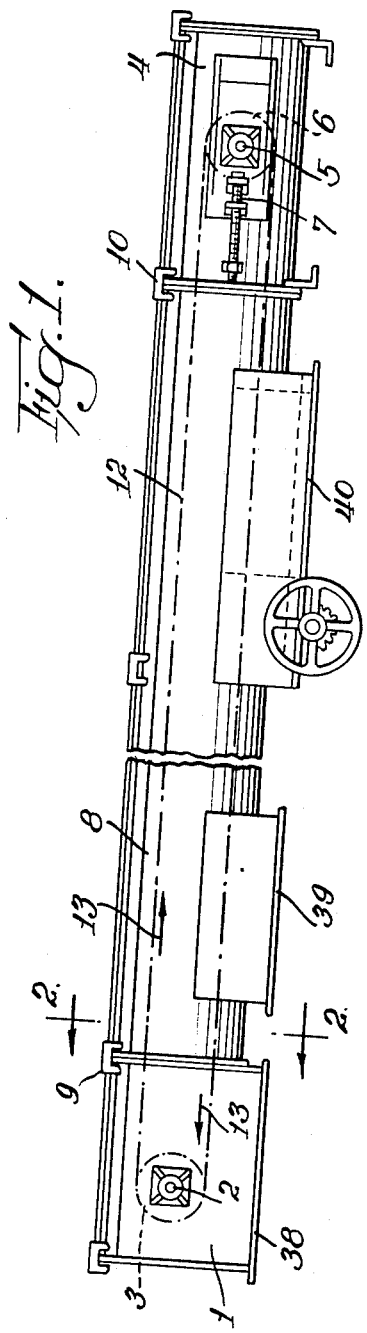
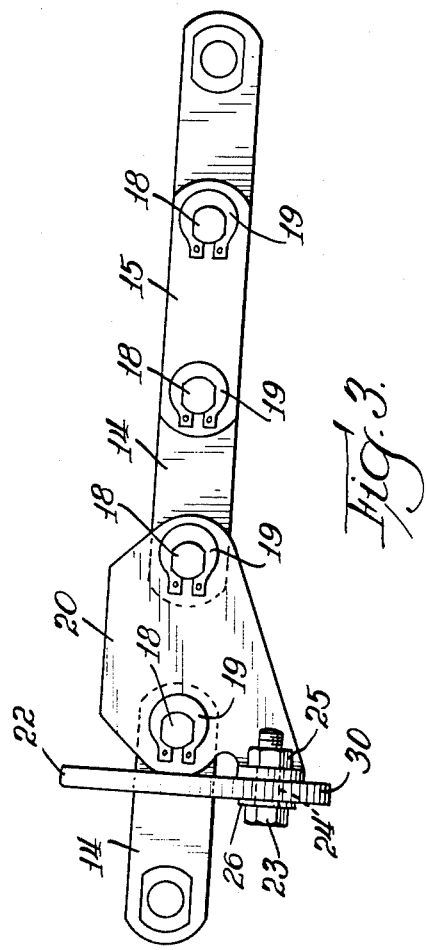
INVENTOR.
Max W. Asher
BY
Attys.

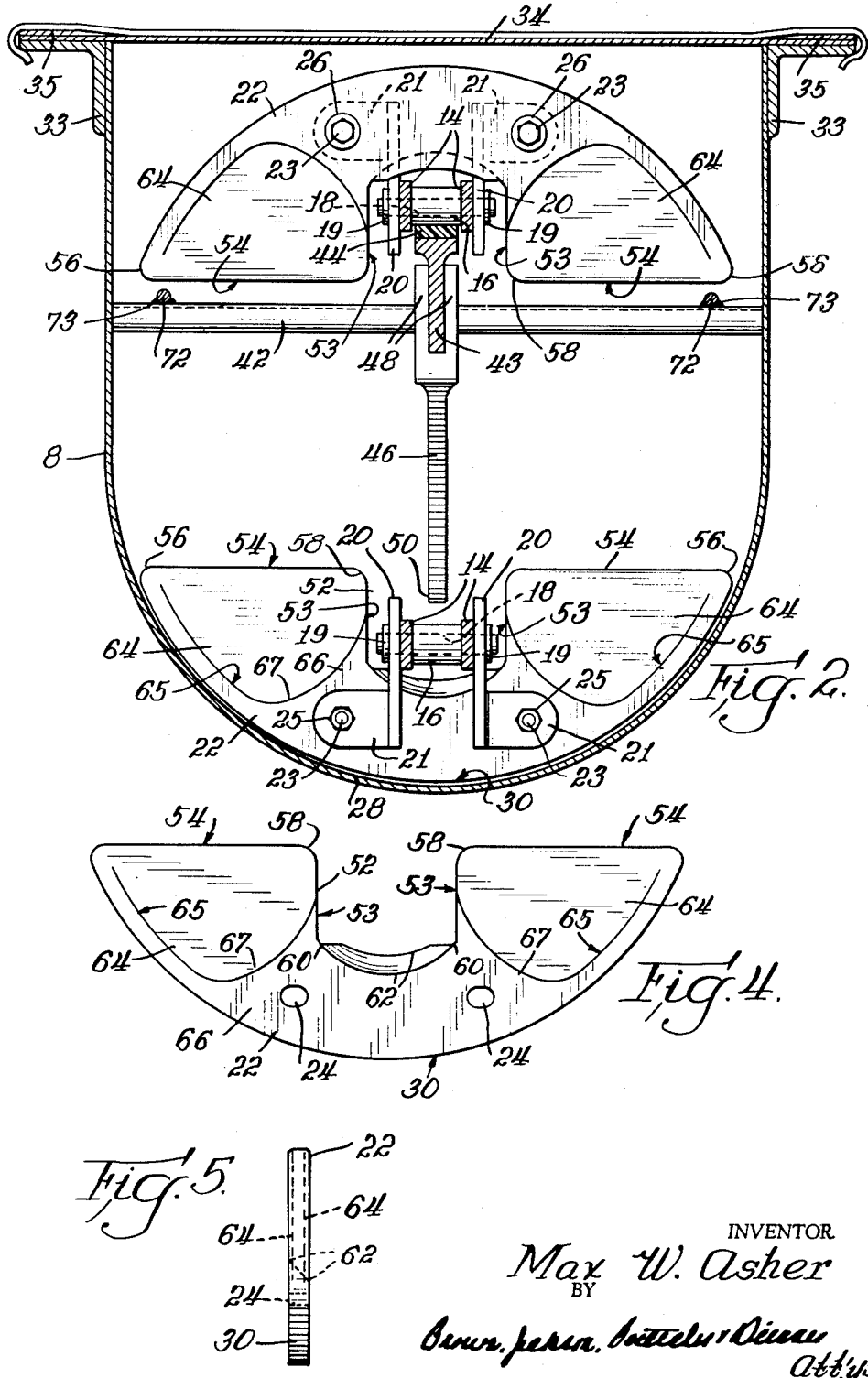

United States Patent Office 3,140,775
Patented July 14, 1964

3,140,775
CONVEYOR
Max W. Asher, Riverdale, Ill., assignor to Screw Conveyor Corporation, Hammond, Ind., a corporation of Illinois
Filed Oct. 9, 1962, Ser. No. 229,356
4 Claims. (Cl. 198—174)

This invention relates, in general, to a conveying apparatus and has particular relation to endless chain or belt type conveyors for horizontal and inclined conveying of grain, flour, seed, chemicals, coffee, starch, sugar, fertilizers, aggregates and other free-flowing materials.

In general, such conveyors comprise an endless power driven chain, belt, or the like, with attached flights and with the lower run of the chain, belt, or the like, and the attached flights operating in the bottom of a conveyor trough to move or convey the material along the trough either horizontally or at an incline.

The conveyor disclosed in Edward P. Escher, Patent No. 3,047,128, patented July 31, 1962, is an illustrative example of one form of conveyor with which the present invention is concerned.

The flights of the aforementioned patent have rounded outer edges which match the rounded contour of the bottom of the conveyor trough; also generally horizontal end edges directed upwardly along the lower run of the conveyor and directed downwardly along the upper run of the conveyor. The generally horizontal end edges are relatively short and the flight recesses for the chain far exceed the width of the chain, the edges of the flights being tapered or curved inwardly to the intermediate horizontal inner edges of the flights.

The foregoing types of flight structure leave large open spaces between the opposite ends of the flights. Previously, it has been thought that the load or material which it is intended to convey will ride on that portion of the material carried by the flights. However, with many materials, such as feed pellets, for example, the load or material which it is intended to convey does not ride or carry along with the portion of the material carried by the flights, but rolls or passes back through the spaces in the flights, particularly where the conveyor operates at an inclination.

The aforementioned rolling or passing of the material back through the spaces in the flights counter or in a direction opposite the direction in which it is intended to be conveyed very greatly lessens or reduces the conveying capacity of the conveyor.

The broad concept of the present invention resides in the provision of an improved form of flight structure in which the flight recesses for the chain to which the flights are attached are only sufficiently wide to accommodate the chain, for example, of a width of only about or less than one-fourth of the overall width of the flight, instead of being of a width of about one-half or more of the width of the flight. In this way about one-fifth, for example, may be added to the flight area, and the conveying capacity of the conveyor is greatly increased, particularly with materials which roll or pass back through the spaces in the flights counter or in a direction opposite to the direction in which it is intended to convey the material.

Another object is to provide an improved form of flight structure having rounded outer edges which match the rounded contour of the bottom of the conveyor trough; also generally horizontal end edges of increased extent directed upwardly along the lower run of the conveyor and directed downwardly along the upper run of the conveyor, and flight recesses defined by inner side edges of the flights disposed parallel and at substantially right angles to the horizontal end edges of the flights and spaced apart just sufficiently to accommodate the chain.

More particularly, the inner side edges defining the flight recess are rounded at their outer ends into the horizontal end edges of the flight and at their outer ends are rounded into rounded intermediate inner edges of the flight recesses.

Another object is to provide an improved form of flight structure composed of nylon plastic provided with flight recesses only sufficiently wide to accommodate the chain and adapted for attachment to flight attachment links of the chain.

Another object is to provide an improved form of flight structure having flight recesses only sufficiently wide to accommodate the chain and in which the opposite sides of the flight including the added flight areas are recessed inwardly from a spaced distance from the rounded outer edge of the flight to the horizontal end edges and at least to the inner portions of the inner side edges defining the chain receiving recess of the flight.

Further features and numerous advantages and adaptations of the invention will be apparent from the following detailed description taken in connection with the accompanying drawings, it being understood that the invention is limited only within the scope of the appended claims and not to the particular embodiment selected for illustration.

In the drawings:

FIGURE 1 is a side elevational view showing one form of conveyor with which the flights of the present invention may be employed;

FIGURE 2 is a transverse sectional view taken along the line 2—2 of FIGURE 1;

FIGURE 3 is a fragmentary side elevational view of the endless conveyor chain showing a flight according to the present invention attached thereto;

FIGURE 4 is a side view of one of the flights according to the present invention; and FIGURE 5 is an end view of the flight illustrated in FIGURE 4.

Referring now to the drawings, the conveyor illustrated in FIGURE 1 is inclined upwardly from the right hand to the left hand end and comprises a head section 1 fitted with a shaft 2 bearings and a driving sprocket 3.

The tail section 4 comprises a tail shaft 5, sprocket 6, and take-up 7 which may be of standard or any other desired form.

The intermediate trough section, or sections 8 are attached at opposite ends to the head section 1 at 9 and to the tail section 4 at 10. Where there is more than one intermediate section 8, their adjacent ends are attached together, as well understood in the art.

The conveyor comprises an endless chain, belt, or the like 12 trained about the sprockets 3 and 6 and driven in the direction indicated by the arrows 13 in FIGURE 1 and at an incline along the bottom or lower run of the conveyor.

While a roller chain, cable, or other form of endless belt, or the like may be employed, the chain 12 selected for illustration is of the form more fully disclosed in the pending application of Russell B. Maas, Serial No. 109,293, filed May 11, 1961. The chain 12 comprises a plurality of pivotally connected inner and outer links 14 and 15 of steel or other suitable material. Hardened steel tubular bushings 16 are disposed between the inner links 14. The outer links 15 are disposed over the outer sides of the inner links 14 and the inner and outer links are pivotally connected by pins 18, preferably hardened alloy steel pins. Snap rings 19 retain the outer links in place on the ends of the pins 18.

Certain of the outer links are in the form of attachment links 20 having outturned attachment lugs 21.

Flights 22 for moving or conveying the material along the bottom of the trough from the tail section 4 to the head section 1 are attached to the lugs 21, for example, by machine screws 23 passing through openings 24 in the lugs 21 and flights 22. The screws 23 engage in lock nuts 25 and washers 26 may be provided between the heads of the screws and the flights 22.

The trough sections 8 may be standard U-shaped troughing, preferably galvanized and fitted together in the usual manner. The bottom of the trough is rounded at 28 and the flights 22 have rounded outer edges 30 fitting the contour of the bottom of the trough shown in FIGURE 2. Welded or otherwise secured to the upper portions of the outer surfaces of the sides 32 of the trough 8 are angle members 33. The top of the trough may be closed by cover plates 34 clamped and dust-sealed by clamping and dust-sealing means 35, which may be of the form more fully disclosed in United States Patent No. 2,459,770, Edward P. Escher, patented January 18, 1949. Other forms of covers and other forms of application thereof to the trough may be employed within the scope of the present invention.

The material which is to be handled by the conveyor may be delivered into the top of the trough, for example, by a spout (not shown) located as desired. When the endless chain 12 is driven, for example, in the direction indicated by the arrows 13 in FIGURE 1, the flights convey the material along the bottom of the trough, for example, at an inclination toward the left as viewed in FIGURE 1 to the head section 1. The bottom of the head section 1 is open at 38, and the material is discharged downwardly through this opening. Additional discharges may be provided, if desired, for example, at 39 and 40.

Cross steel guide supports 42 of tubular form secured at opposite ends to the sides of the trough support a travel bar 43. The supports 42 may be welded at their opposite ends to the sides of the trough 8 or may be secured in place by rods extending through the supports 42 with nuts threaded on the ends of the rods, or otherwise as desired.

For the purpose of reducing wear on the chain 12 and particularly on the bushings 16 and on the travel bar, a strip 44 of about ¼ inch thickness covers the upper suface of the travel bar 43 and is presented to the chain as shown in FIGURE 2. This strip 44 coacts with the upper run of the endless conveyor and particularly with the bushings 16 thereof for supporting the upper run of the conveyor in its longitudinal movement within the trough.

The strip 46 may be in the form of a cold rolled steel strip, or it may be formed of "Ancorene," which is a high impact styrene, or of "Gatke," which is a graphatex material, or of other suitable materials.

A hold-down bar 46 is adjustable longitudinally to any desired position along the travel bar 43 and has pads or flanges 48 coacting with the opposite sides of the travel bar 43 and the hold-down bar 46 is secured to the travel bar 43 in the desired position. The lower hold-down portion 50 of the hold-down bar 46 coacts with the endless conveyor and particularly with the bushings 16 to hold the flights along the lower run of the conveyor properly positioned in the volume of material and against objectionable rise of the flights out of the material.

The flight structure 22 according to the present invention is as previously set forth preferably composed of Du Pont nylon plastic such as "Zytel 103," or other suitable material, having the rounded outer edge 30 which matches the rounded contour of the bottom of the conveyor trough. The flight 22 has a flight recess 52 only sufficiently wide to accommodate the chain 12 as shown in FIGURE 2.

The flight recess 52 is defined by inner side edges 53 disposed parallel and at substantially right angles to the horizontal end edges 54. In the illustrated embodiment of the invention the recess 52 which opens from the inner edge of the flight 22 is of a width of only about or less than one-fourth of the overall width of the flight, instead of being of a width of about one-half or more of the width of the flight. The end edges 54 extend horizontally inwardly from the rounded outer edge 30 and are rounded at their outer ends at 56 into the rounded outer edge 30. The inner ends of the horizontal end edges 54 are rounded at 58 into the inner ends of the side edges 53.

With the aforementioned structure about one-fifth, for example, may be added to the flight area, and the conveying capacity of the conveyor is greatly increased, particularly with materials which otherwise would roll or pass back through the spaces in the flight's counter or in a direction opposite to the direction in which it is intended to convey the material.

The inner side edges 53 defining the flight recess 52 are rounded at their outer ends at 60 into rounded intermediate inner edges 62 of the flight recess 52.

The opposite sides of the flight 22 including the added flight areas are recessed inwardly at 64 from a spaced distance 65 from the rounded outer edge 30 of the flight to the horizontal end edges 54 and at least to the inner portions of the inner side edges 53. The ends of the intermediate thicker portion 66 of the flight may be rounded at 67 into the rounded edge 65, spaced inwardly from the rounded outer edge 30.

The holes or openings 24 in the flight 22 through which the screws 23 pass for attaching the flight 22 to the lugs 21 of the links 20 are preferably elongated horizontally as shown in FIGURE 4.

The increase in the conveying capacity of the conveyor by the improved flight structure of the present application may be in bushels per hour or pounds per hour depending upon the material being conveyed, or otherwise as desired.

Rods 72 extending longitudinally over the cross guide supports 42 and attached to the supports 42, for example, by welding at 73, or otherwise as desired. One of the rods 72 is disposed beneath each of the downwardly directed horizontal end edges 54 along the return run of the conveyor. The rods 72 prevent or limit tipping of the flights 22 in amount which would permit the endless chain from getting off of the guide strip 44, or which would permit the ends of the flights from getting below the cross supports 42, or other parts, which might result in breaking or injuring the flights, or jamming or blocking the operation of the conveyor.

The embodiment of the invention disclosed in the drawings and the specifications is for illustrative purposes only, and it is to be expressly understood that said drawings and specifications are not to be construed as a definition of the limits or scope of the invention reference being had to the appended claims for that purpose.

I claim:

1. A conveyor comprising a conveyor trough having a rounded bottom over the major portion of which material is adapted to be conveyed and spaced upright sides, a laterally elongated conveyor flight of generally planar form disposed perpendicular to the bottom of the trough over the major portion thereof and having a rounded lower edge conforming with the bottom of said trough, the upper edge of said conveyor flight having a recess defined by inner side edges disposed in parallel relation, a conveyor chain operable longitudinally within said trough and disposed within said recess in said flight and attached to said flight, the inner side edges of said flight recess being in close proximity to the opposite sides of the chain and extending inwardly of said chain, said flight having horizontal edges extending from the inner ends of the side edges of the flight recess normal to said side edges and to the opposite ends of the rounded lower edge of the flight, each of said horizontal edges of said flight extending laterally in amount greater than the width of the flight recess whereby the flight area and conveying capacity of the conveyor are increased particularly with materials which otherwise would roll or pass back in a direction opposite to the direction in which the material is intended to be conveyed.

2. A conveyor according to claim 1, wherein the laterally elongated conveyor flight is composed of nylon plastic material.

3. A conveyor according to claim 1, wherein the opposite sides of the flight are recessed inwardly from a distance spaced from the rounded edge of the flight to the horizontal edges of the flight and at least to the inner portions of the inner side edges defining the recess in the flight.

4. A conveyor according to claim 1, further comprising a travel bar for the upper run of the conveyor chain and a wear strip on said travel bar coacting with said conveyor chain.

References Cited in the file of this patent
UNITED STATES PATENTS

| | | |
|---|---|---|
| 1,769,336 | Detaint | July 1, 1930 |
| 2,660,310 | Hapman | Nov. 24, 1953 |
| 3,047,128 | Escher | July 31, 1962 |